United States Patent
Lee et al.

(10) Patent No.: US 9,065,096 B2
(45) Date of Patent: Jun. 23, 2015

(54) FUEL CELL STACK

(75) Inventors: Seung-Tae Lee, Yongin-si (KR); Jan-Dee Kim, Yongin-si (KR); Jun-Won Suh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 946 days.

(21) Appl. No.: 13/192,224

(22) Filed: Jul. 27, 2011

(65) Prior Publication Data

US 2012/0217812 A1    Aug. 30, 2012

Related U.S. Application Data

(60) Provisional application No. 61/446,394, filed on Feb. 24, 2011.

(51) Int. Cl.
| | | |
|---|---|---|
| H02J 1/00 | (2006.01) | |
| H01M 8/04 | (2006.01) | |
| H01M 8/02 | (2006.01) | |
| H01M 8/24 | (2006.01) | |
| H02J 1/10 | (2006.01) | |
| H01M 8/12 | (2006.01) | |

(52) U.S. Cl.
CPC ........ *H01M 8/04246* (2013.01); *H01M 8/0202* (2013.01); *H01M 8/04955* (2013.01); *H01M 8/243* (2013.01); H01M 2008/1293 (2013.01); *H01M 8/2465* (2013.01); *Y02E 60/50* (2013.01); *Y02E 60/525* (2013.01); *H02J 1/00* (2013.01); *H02J 1/10* (2013.01); *H02J 2001/004* (2013.01)

(58) Field of Classification Search
USPC .......................................................... 307/71
See application file for complete search history.

(56) References Cited

U.S. PATENT DOCUMENTS

| | | | |
|---|---|---|---|
| 6,099,986 A | 8/2000 | Gauthier et al. | |
| 6,573,682 B1 | 6/2003 | Pearson | |
| 6,913,845 B2 | 7/2005 | Bekkedahl et al. | |
| 7,488,551 B2 * | 2/2009 | Artibise et al. | 429/457 |
| 8,389,180 B2 * | 3/2013 | Hawkes et al. | 429/517 |
| 2004/0081866 A1 * | 4/2004 | Bekkedahl et al. | 429/19 |
| 2004/0185319 A1 * | 9/2004 | Enjoji et al. | 429/34 |
| 2004/0197637 A1 * | 10/2004 | Blum | 429/40 |
| 2004/0234832 A1 | 11/2004 | Kuroishi et al. | |

(Continued)

FOREIGN PATENT DOCUMENTS

| | | |
|---|---|---|
| CN | 1618143 A | 5/2005 |
| CN | 1708873 A | 12/2005 |

(Continued)

OTHER PUBLICATIONS

EPO Office action dated Jul. 2, 2013, for corresponding European Patent application 11175873.6, (6 pages).

(Continued)

*Primary Examiner* — Jared Fureman
*Assistant Examiner* — Duc M Pham
(74) *Attorney, Agent, or Firm* — Christie, Parker & Hale LLP

(57) ABSTRACT

A fuel cell stack includes a plurality of unit cells, bypass resistors, and connective resistors. The unit cells are connected in series and/or in parallel. The connected resistors are disposed between the unit cells connected in series and disconnected by heat due to resistance at a small current value in comparison to an current collector. The bypass resistors are connected in parallel to the unit cells or the unit cells connected in parallel.

16 Claims, 6 Drawing Sheets

(56) References Cited

U.S. PATENT DOCUMENTS

| | | | |
|---|---|---|---|
| 2006/0035128 A1* | 2/2006 | Draper et al. | 429/32 |
| 2007/0188147 A1 | 8/2007 | Straubel et al. | |
| 2008/0213643 A1 | 9/2008 | Escorihuela | |
| 2009/0011309 A1 | 1/2009 | Shimoi et al. | |
| 2010/0035092 A1 | 2/2010 | Gurunathan et al. | |
| 2010/0173213 A1* | 7/2010 | Lange et al. | 429/436 |
| 2010/0209802 A1 | 8/2010 | Armstrong et al. | |
| 2012/0021327 A1* | 1/2012 | Watanabe et al. | 429/466 |

FOREIGN PATENT DOCUMENTS

| | | |
|---|---|---|
| EP | 0 664 571 A1 | 7/1995 |
| EP | 1 450 429 A1 | 8/2004 |
| EP | 2 230 529 A1 | 9/2010 |
| JP | 03-008266 | 1/1991 |
| JP | 10-223248 A | 8/1998 |
| JP | 2000-058079 | 2/2000 |
| JP | 2002-260706 | 9/2002 |
| JP | 2005-203254 A | 7/2005 |
| KR | 10-2004-0086753 A | 10/2004 |
| KR | 10-2007-0093279 A | 9/2007 |

OTHER PUBLICATIONS

EP Office Action dated Jun. 8, 2012 for EP 11175873.6 (8 pages).
Extended European Search Report for EP 11175873.6, dated Oct. 23, 2012, 18 pgs.
SIPO Office action dated Dec. 12, 2013, Issued in Chinese Patent Application No. 201110303908.6, (11 Pages), and English Translation, (15 Pages).

* cited by examiner

FUEL CELL STACK

CROSS-REFERENCE TO RELATED APPLICATIONS

This application claims priority to and the benefit of U.S. Provisional Application No. 61/446,394, filed on Feb. 24, 2011, in the United States Patent and Trademark Office, the entire content of which is incorporated herein by reference.

BACKGROUND

1. Field

Aspects of embodiments of the present invention relate to a fuel cell stack.

2. Description of the Related Art

Fuel cells are devices that convert the energy of fuel into electric energy, in which a pair of electrodes—an anode and a cathode—are disposed with an electrolyte therebetween, hydrogen or a fuel gas containing hydrogen comes in contact with the anode (fuel electrode) and an oxide gas comes in contact with the cathode (air electrode), such that the devices generate electricity and heat through an electrochemical reaction of the fuel gas and the oxide gas, which are ionized in the process described above.

Fuel cell stacks have improved performance when the unit cells connected in series have the same voltage and current characteristics. However, when any one of the unit cells connected in series has a defect and the current and voltage characteristics change, the performance of the entire stack decreases, such that the entire stack should be replaced, even if one unit cell has a problem.

SUMMARY

Aspects of embodiments of the present invention are directed toward an effort to provide a fuel cell stack that can protect the other unit cells from being damaged and that can prevent or reduce a decrease in performance of the entire fuel cell stack when a defect occurs in a cell or an electric short is generated during the assembly of the fuel cell stack including a stack and an electric connection structure.

According to an embodiment of the present invention, a fuel cell stack includes: a first bundle of unit cells electrically connected to one another in parallel; a current collector electrically connected to at least one unit cell of the unit cells of the first bundle; and a connective resistor connected in series with the at least one unit cell for interrupting a current path of the at least one of the unit cell.

The fuel cell stack may further include a first bypass resistor electrically connected to the first bundle of unit cells in parallel.

A resistance of the bypass resistor may be greater than a resistance of an ohmic polarization portion of each unit cell of the first bundle of unit cells.

A resistance of the bypass resistor may be less than three times the sum of a resistance of an ohmic polarization portion of each unit cell of the first bundle of unit cells and a resistance of the current collector The bypass resistor may have a resistance greater than a resistance of the current collector.

The fuel cell stack may further include a second bundle of unit cells electrically connected to one another in parallel, the second bundle of unit cells being electrically connected to the first bundle of unit cells in series.

The fuel cell stack may further include a first bypass resistor coupled to the first bundle of unit cells in parallel.

The connective resistor may include a plurality of connective resistors, each of the connective resistors being electrically connected to a corresponding unit cell of the first bundle of unit cells.

The current collector may include a plurality of current collectors, each of the current collectors being electrically connected to the corresponding unit cell.

The connective resistor may have a melting point lower than a melting point of the current collector.

The connective resistor may have a resistance greater than a resistance of the current collector.

The connective resistor may be longer than the current collector in a current flow direction.

The connective resistor may have a cross-sectional area smaller than a cross sectional area of the current collector perpendicular to a current flow direction.

The connective resistor and the current collector may be composed of the same material.

The connective resistors may include a metal selected from the group consisting of Au, Ag, Pt, Ni, Cu, Fe, Cr, Mn, Ti, and combinations thereof.

Each of the unit cells may include a first electrode having a first polarity and a second electrode having a second polarity different from the first polarity, wherein the first electrode is electrically connected to the current collector and the second electrode is electrically connected to the connective resistor.

According to another embodiment of the present invention, a fuel cell stack includes: a plurality of unit cells electrically connected to one another in series; a plurality of current collectors, each of the current collectors being electrically connected to a corresponding one of the unit cells; and a plurality of bypass resistors, each of the bypass resistors being electrically connected to a corresponding one of the unit cells in parallel.

Adjacent unit cells of the plurality of unit cells are electrically connected with each other through one or more current collectors of the current collectors between the adjacent unit cells.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
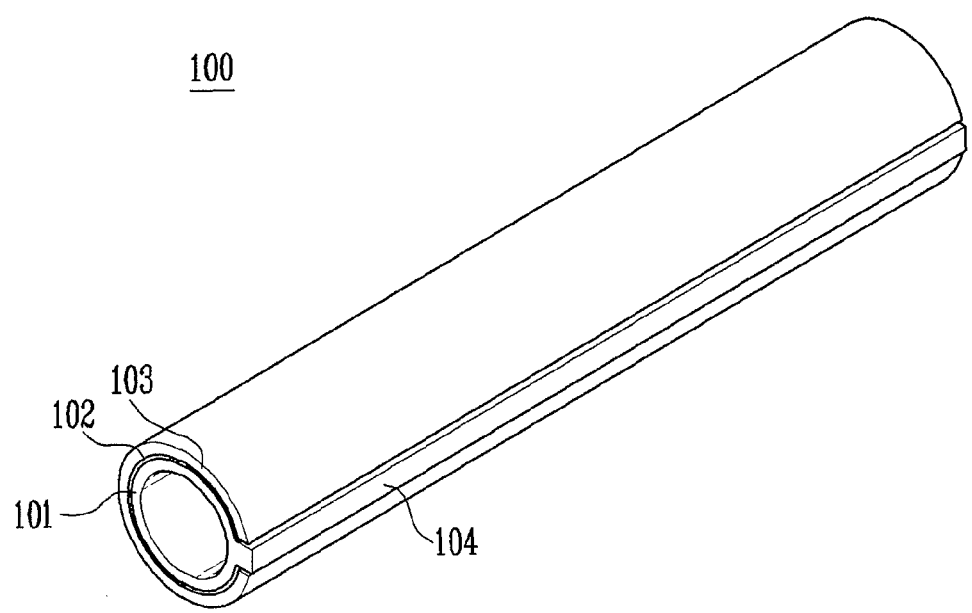
FIG. 1 is a perspective diagram showing a unit cell according to an embodiment of the present invention.

Hereinafter, embodiments of the present invention will be described with reference to the accompanying drawings. The terms representing directions used herein are considered to be based on the status shown in the drawings, if not specifically defined or stated. Further, the same reference numerals represent the same parts throughout the embodiments.

Generally, fuel cells include a fuel converter (reformer and reactor) for reforming and supplying fuel and a fuel cell module. The fuel cell module is typically an assembly including a fuel cell stack for converting chemical energy into electric energy and thermal energy in an electrochemical method. That is, a fuel cell module includes: a fuel cell stack; a pipe system through which fuel, oxides, cooling water, and waste matters move; a wire that transmits electricity produced by the stack; a component for controlling or monitoring the stack, and a component that monitors for problems in the stack.

Aspects of embodiments of the present invention relate to a fuel cell stack having an electrical connection structure between unit cells which makes it possible to provide stable performance, even under disconnection (e.g., open circuit) or short in a specific part. Embodiments of the present invention are described hereafter in more detail.

A unit cell 100 is described with reference to FIG. 1. FIG. 1 is a perspective diagram of the unit cell 100 according to an embodiment of the present invention.

The unit cell 100 is supplied with reformed fuel from a fuel converter and produces electricity using an oxidation reaction. The unit cell 100 is generally cylindrical or tubular in shape and formed with an electrical interconnect, as shown in FIG. 1. A first electrode layer 101, an electrolyte 102, and a second electrode layer 103 are radially stacked from the central axis of the unit cell 100. An interconnector 104 extends longitudinally along the outer circumferential surface of the first electrode layer 101. The interconnector 104 electrically connects the first electrode layer 101 with an external circuit. The electrolyte 102 is on portions (e.g., the circumferential surface) of the first electrode layer 101 where the interconnector 104 is not formed. Further, the second electrode layer 103 is on the outer circumferential surface of the electrolyte 102. In this structure, the second electrode layer 103 and the interconnector 104 are spatially separated or electrically insulated from one another by an insulator therebetween.

The unit cell 100 is formed in an anode-supported configuration or a cathode-supported configuration, if necessary. Embodiments of the present invention are not limited to anode-supported or cathode-supported configurations. That is, the first electrode layer 101 may be an anode (e.g., a fuel electrode) or a cathode (e.g., an air electrode).

The air electrode may be made of a pure electronic conductor or a mixed conductor having high ion conductivity and electronic conductivity such as $LaMnO_3$-based or $LaCoO_3$-based materials. Such materials are stable in an oxidation atmosphere and do not chemically react with the electrolyte, which is described below. The electrolyte functions as a channel for oxygen ions generated at the air electrode or hydrogen ions generated at the fuel electrode. The electrolyte is made of a ceramic material that is sufficiently dense to substantially prevent or protects from permeation of air through the electrolyte. For example, yttria-stabilized zirconia (hereafter, referred to as "YSZ") in which a small amount of $Y_2O_3$ is added to $ZrO_2$ may be used for the material of the electrolyte. The fuel electrode is a component where a hydrogen gas, which is the fuel for the fuel cell, is supplied. The fuel electrode may be made of a ceramic material such as the YSZ described above. For example, the fuel electrode may be made of a metal ceramic cermet such as NiO-8YSZ or Ni-8YSZ, which is cheap and stable under a high-temperature reduction atmosphere.

Figure 2A:
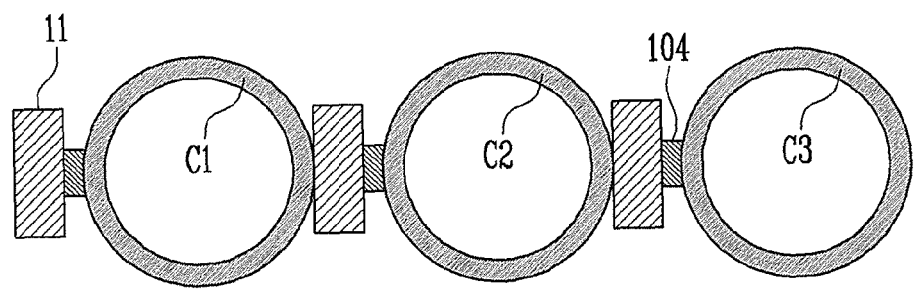
FIG. 2A is a schematic diagram showing a plurality of unit cells electrically connected in series.
Figure 2B:
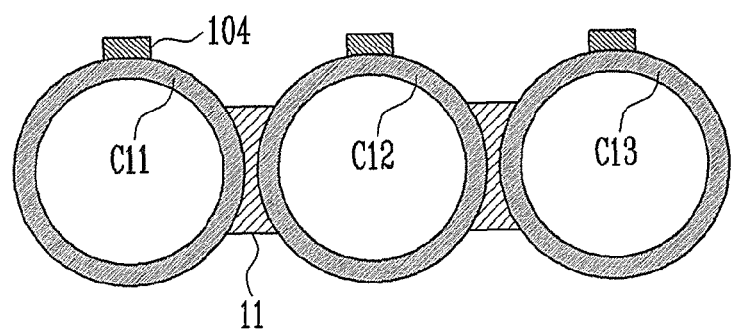
FIG. 2B is a schematic diagram showing a plurality of unit cells electrically connected in parallel.
Figure 2C:
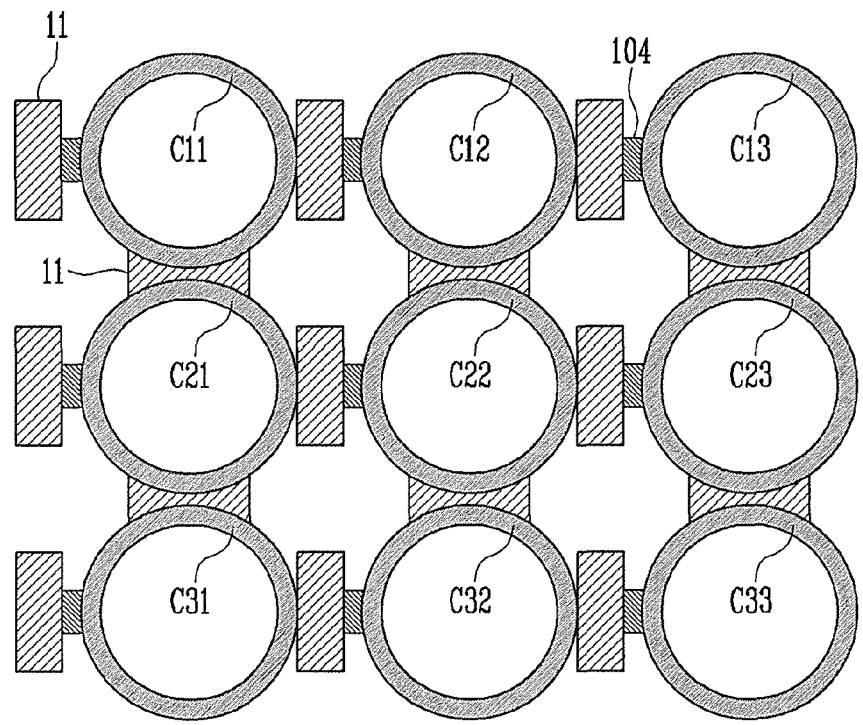
FIG. 2C is a schematic diagram showing a plurality of unit cells electrically connected in series-parallel mixed form.
Figure 3A:
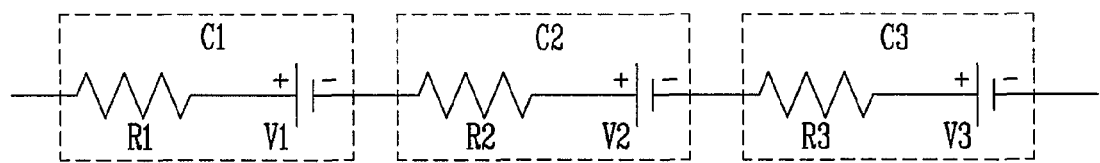
FIG. 3A is a circuit diagram showing a plurality of unit cells electrically connected in series.
Figure 3B:
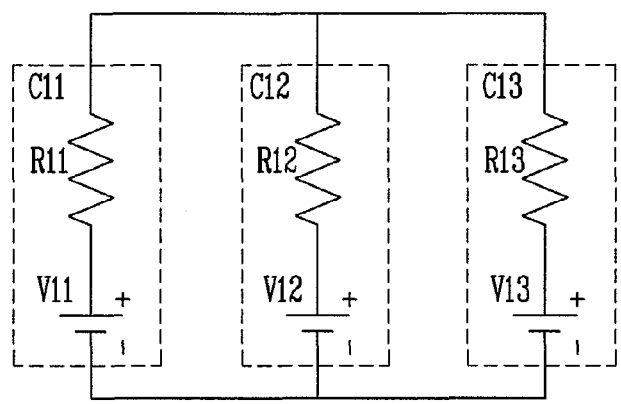
FIG. 3B is a circuit diagram showing a plurality of unit cells electrically connected in parallel.

The electrical connections between unit cells according to various embodiments of the present invention are described with reference to FIGS. 2A to 3B. FIG. 2A is a schematic diagram showing a plurality of unit cells electrically connected in series, FIG. 2B is a schematic diagram showing a plurality of unit cells are connected in parallel, and FIG. 2C is a schematic diagram showing a plurality of unit cells electrically connected in series-parallel mixed form. Further, FIG. 3A is a circuit diagram showing a plurality of unit cells electrically connected in series and FIG. 3B is a circuit diagram showing a plurality of unit cells electrically connected in parallel.

When unit cells are electrically connected in series, the interconnectors of some of the unit cells are in contact with the outer circumferential surfaces of other unit cells, e.g., as shown in FIG. 2A, current collectors 11 are disposed between the interconnectors 104 of the unit cells C2 and C3 and the outer circumferential surfaces of the other unit cells C1 and C2 to form electrical connections.

When the unit cells are electrically connected in parallel, the outer circumferential surfaces of the unit cells are electrically connected to each other, e.g., as shown in FIG. 2B, current collectors 11 are disposed between the outer circumferential surfaces of the unit cells C11, C12, and C13.

When the unit cells are connected in a series-parallel mixed type, the electrical connections as used for the series connection and for the parallel connection are mixed to form the electrical connections. For example, as shown in FIG. 2C, unit cells that are connected in series (e.g., C11, C12, and C13) have interconnectors 104 (e.g., interconnectors of C12, C22, and C32) which are electrically connected to the outer circumferential surfaces of other unit cells (e.g., C11, C21, and C31, respectively) either directly or by the current collectors 11. By contrast, unit cells that are electrically connected in parallel (e.g., C11 and C21) have outer circumferential surfaces which are electrically connected together either directly or by the electricity connectors 11. A fuel cell stack or bundle is achieved in this way.

Unit cells that are connected in series and in parallel according to embodiments of the present invention are shown as circuit diagrams in FIGS. 3A and 3B. That is, the open circuit voltage (OCV) of each of the unit cells C1, C2, C3, C11, C12, and C13 can be expressed by voltage sources V1, V2, V3, V11, V12, and V13, respectively, or may be expressed by one internal resistance (or resistor) R1, R2, R3, R11, R12, and R13, respectively, the internal resistance being derived by adding all of resistances between the electrolyte and the electrodes, the resistance of the electrodes themselves, the current collectors, the interconnectors, and various contact resistances.

When the performance of any one of the unit cells in the fuel cell stack decreases and the internal resistance abnormally increases or a unit cell has an electrical short, the performance of the entire fuel cell stack may greatly decrease or malfunction may be caused. Embodiments of the present invention (which relate to fuel cell stacks that prevent or reduce the above problem) are described hereafter, in the cases of a series connection and a parallel connection.

Embodiment 1

Figure 4A:
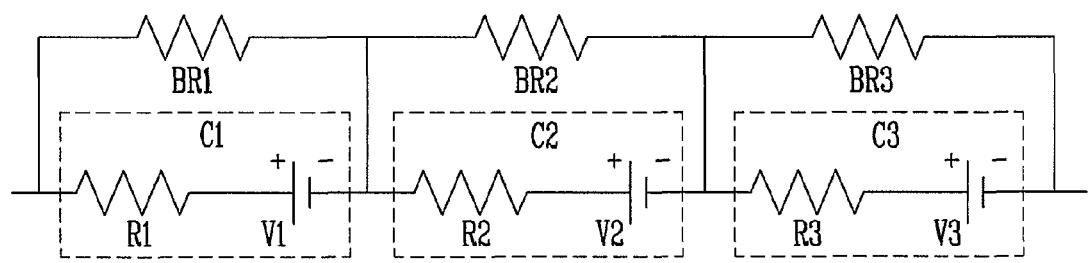
FIG. 4A is a circuit diagram showing a fuel cell stack according to an embodiment of the present invention including a plurality of unit cells electrically connected in series.

A fuel cell stack electrically connected in series according to an embodiment of the present invention is described with reference to FIGS. 4A and 4B. FIG. 4A is a circuit diagram showing a fuel cell stack according to an embodiment of the present invention including a plurality of unit cells electrically coupled in series, and FIG. 4B is a schematic view showing the fuel cell stack of FIG. 4A.

Unit cells C1, C2, and C3 in the fuel cell stack of the embodiment of FIG. 4A are connected in series. As shown in FIG. 4B, current collectors 11 may be disposed between the unit cells C1, C2, and C3. In addition, bypass resistors BR1, BR2, and BR3 are connected in parallel to the unit cells C1, C2, and C3, respectively.

Figure 4B:
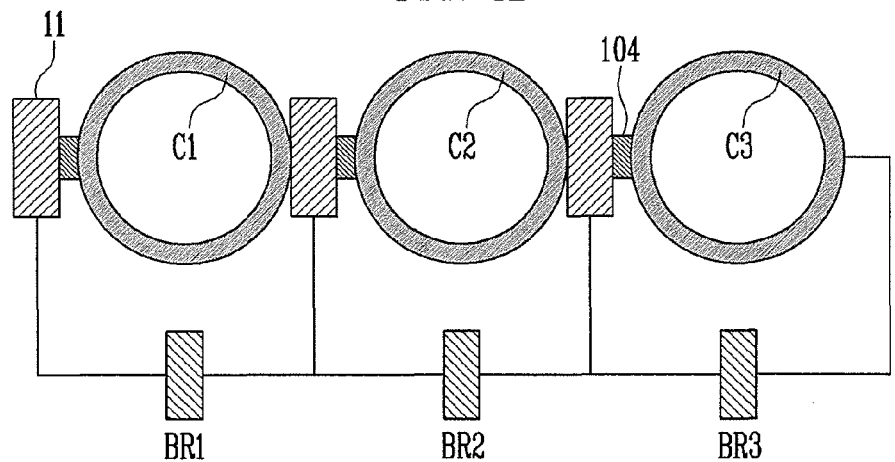
FIG. 4B is a schematic showing the fuel cell stack of FIG. 4A.

In the fuel cell stack according to the embodiment of FIGS. 4A and 4B, when the performance of any one unit cell decreases and its internal resistance abnormally increases, current flows through the bypass resistor connected in parallel to the unit cell having increased internal resistance. Therefore, problems related to the decrease of performance of a unit cell are prevented or mitigated.

In the fuel cell stack according to the embodiment of FIGS. 4A and 4B, when an electrical short is generated in any one unit cell (e.g., when any one unit cell appears as an electrical short), the resistance of the unit cells becomes very small or effectively zero, such that the unit cell does not appear to be present, and accordingly, a short circuit does not cause problems for the entire fuel cell stack of unit cells coupled in series.

Portions of the unit cell can be divided into an activation polarization section, an ohmic polarization section, and a concentration polarization section in accordance with where the unit cell voltage changes with respect to current density. The activation polarization section is a region with low current density and is usually influenced by the micro structure of a catalyst and a cell, a reaction of the material and the substance. The ohmic polarization section is a section that is usually influenced by resistance between the electrolyte and the electrodes, the resistance of the electrodes themselves, the current collectors, the interconnectors, and various contact resistances, and is used when a solid oxide fuel cell stack operates. The concentration polarization section is a section where loss due to mass transport increases and the voltage rapidly drops.

The bypass resistors may have a resistance equal to that of the ohmic polarization section of the unit cells, or may have resistance higher than the sum of the resistance of the ohmic polarization section of the unit cells and the resistance of the corresponding current collectors when the current collectors are in between the unit cells. Because the resistance of the current collectors is generally large enough to neglect the resistance of the ohmic polarization section, it is possible to set the resistance of the corresponding current collectors to a lower value when the current collectors are in between the unit cells. However, the resistance of the ohmic polarization section has a resistance (the real number of impedance) which can be measured when the unit cells are measured by an impedance analyzer.

Further, when the resistance of the bypass resistors is three or more times greater than the sum of the resistance of the ohmic polarization section of the unit cells and the resistance of the current collectors in a stack composed of at least two unit cells connected in series, the performance of the stack is decreased by 50% or more. Therefore, in some embodiments of the present invention, the resistance of the bypass resistors is less than or equal to three times the sum of the resistance of the ohmic polarization section of the unit cells and the resistance of the current collectors.

Generally, between two elements connected in parallel, a larger portion of the current flows through the element having smaller resistance. Therefore, when a resistor having resistance greater than the resistance of the ohmic polarization section of the unit cell is used as the bypass resistor, current flows through the corresponding unit cell when the performance of the unit cell is normal, but the current flows through the bypass resistor when the performance of the unit cell decreases and the resistance of the unit cell abnormally increases to a resistance greater than that of the bypass resistor, such that it is possible to somewhat prevent or mitigate overload applied to the unit cell having decreased performance.

Embodiment 2

Figure 5A:
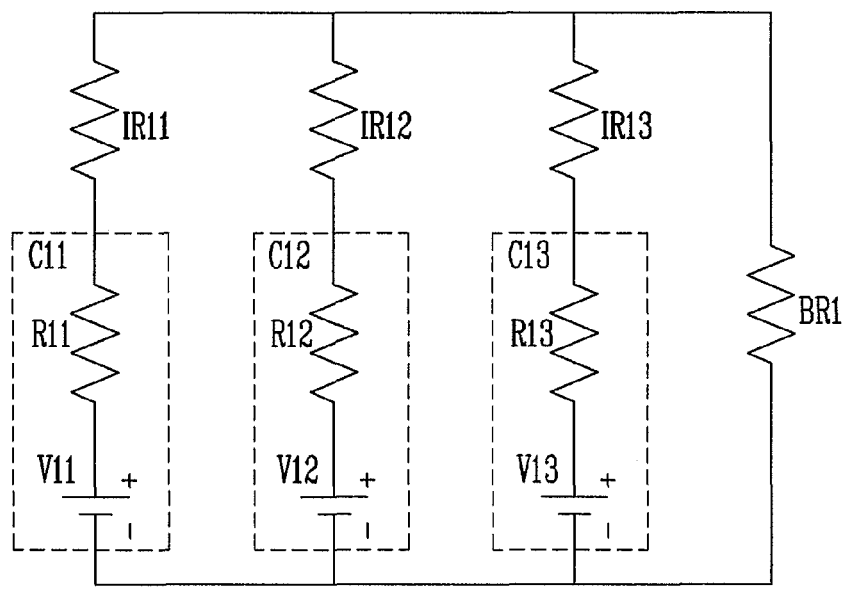
FIG. 5A is a circuit diagram showing a fuel cell stack according to an embodiment of the present invention including a plurality of unit cells electrically connected in parallel.

A fuel cell stack electrically connected in parallel according to an embodiment of the present invention is described with reference to FIGS. 5A and 5B. FIG. 5A is a circuit diagram showing a fuel cell stack according to an embodiment of the present invention including a plurality of unit cells electrically coupled in parallel, and FIG. 5B is a schematic view showing the fuel cell stack of FIG. 5A.

Figure 5B:
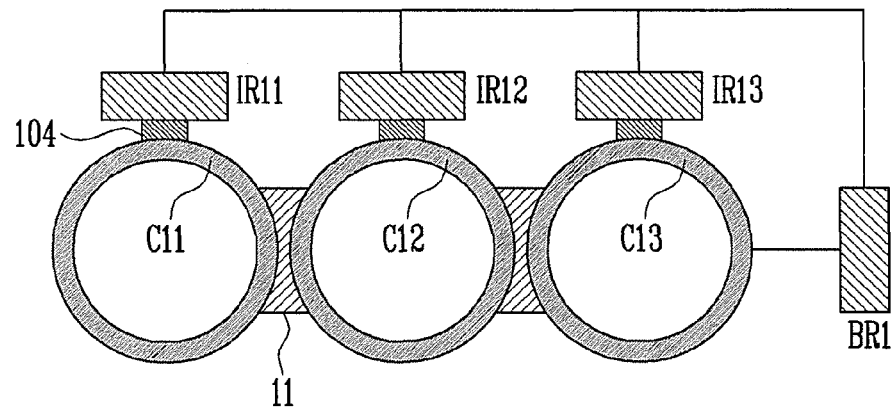
FIG. 5B is a schematic diagram showing the fuel cell stack of FIG. 5A.

Unit cells C11, C12, and C13 in the fuel cell stack of the embodiment of FIGS. 5A and 5B are electrically connected in parallel. As shown in FIG. 5B, current collectors 11 may be disposed between the unit cells C11, C12, and C13. Connective resistors IR11, IR12, and IR13 are connected in series to the unit cells C11, C12, and C13. A bypass resistor BR1 is connected in parallel to the unit cells C11, C12, and C13 and the connective resistors IR11, IR12, and IR13.

The bypass resistor BR1 has the same function and operation as those of the bypass resistors described in connection with Embodiment 1. The detailed description of the bypass resistor is not provided.

The connective resistors IR11, IR12, and IR13 are disconnected by heat generated by its resistance (e.g., resistive heating) at relatively low current values in comparison to current values at which the current collector 11 would melt. In one embodiment of the present invention, in order to achieve such a function, the connective resistors IR11, IR12, and IR13 may be made of a material having a melting point lower than that of the current collector 11 or may be formed to have a resistance characteristic higher than the current collector 11. Further, in terms of the structure, the connective resistors IR11, IR12, and IR13 may be formed longer along the current flow direction than the current collector 11 or formed to have a cross-section smaller than the current collector 11 in a direction perpendicular to the current flow direction. This is because the resistance of a wire is proportional to the length of the wire and is inversely proportional to the cross-sectional area of the wire.

Because the connective resistors should have a melting point that is not too high and a electrical conductivity that is relatively not too small and should not have large influence on the performance of the fuel cell stack, the connective resistors may be made of single metal or an alloy which contains one or more of Au, Ag, Pt, Ni, Cu, Fe, Cr, Mn, and Ti.

When the performance of any one of unit cells decreases and its resistance abnormally increases in the fuel cell stack according to the embodiment of FIGS. 5A and 5B, only the current flowing to the abnormal unit cell decreases, such that the influence on the other cells is reduced.

In fuel cell stacks, an electrical short occurs in any one of unit cells can cause the other unit cells to increase current output to the maximum output of those unit cells, regardless of the designed current value, which can cause a serious problem such as damage to the unit cells.

However, in the fuel cell stack according to the embodiment of FIGS. 5A and 5B, the connective resistors IR11, IR12, and IR13 are disconnected from the fuel cell stack (e.g., the connective resistors disconnect respective unit cells from the fuel cell stack) before the other unit cells are damaged, even if the output of the unit cells increases, such that current flow through the short circuit is stopped and the unit cells are not damaged. Even if all the connective resistors IR11, IR12, and IR13 are disconnected, current flows through the bypass resistor BR1, such that the impact of the short circuit on the entire system is minimized or reduced.

Embodiment 3

Figure 6A:
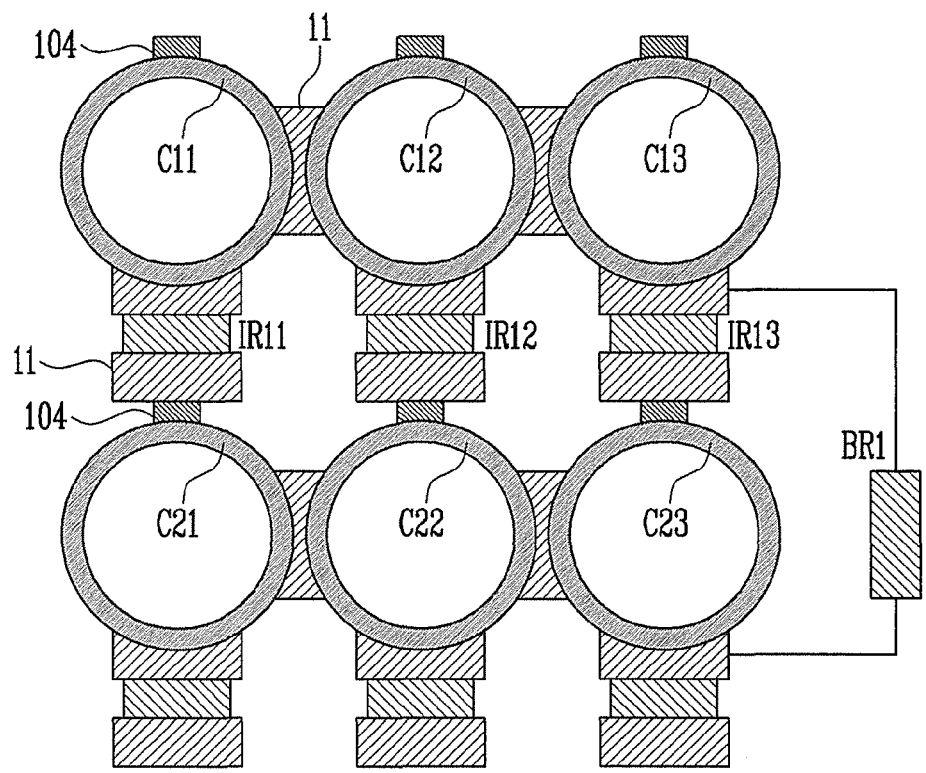
FIGS. 6A, 6B, and 6C are schematic diagrams showing fuel cell stacks according to embodiments of the present invention in series-parallel mixed forms.
Figure 6B:
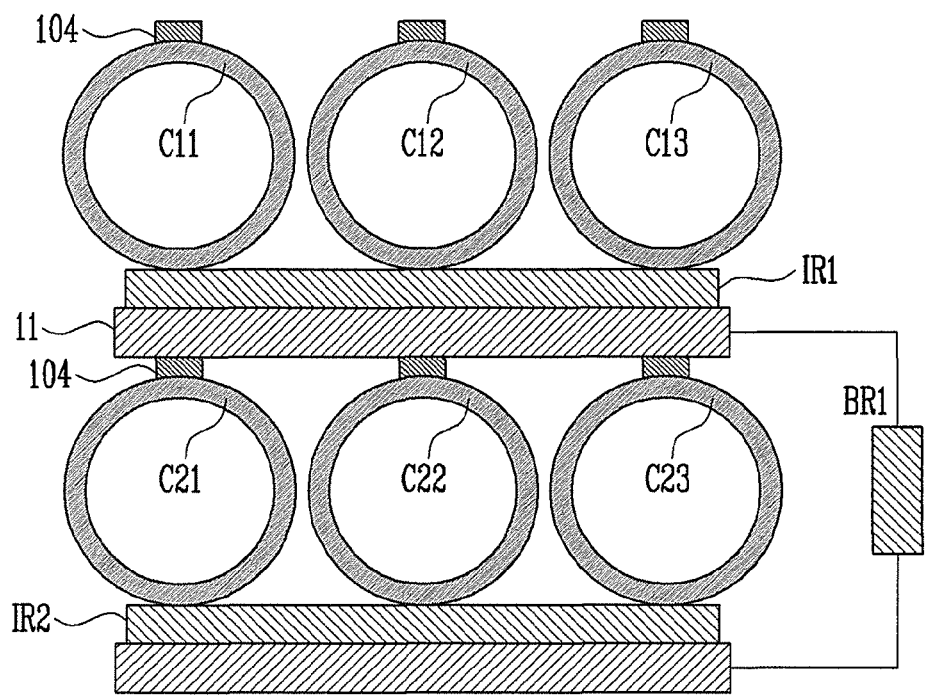
Figure 6C:
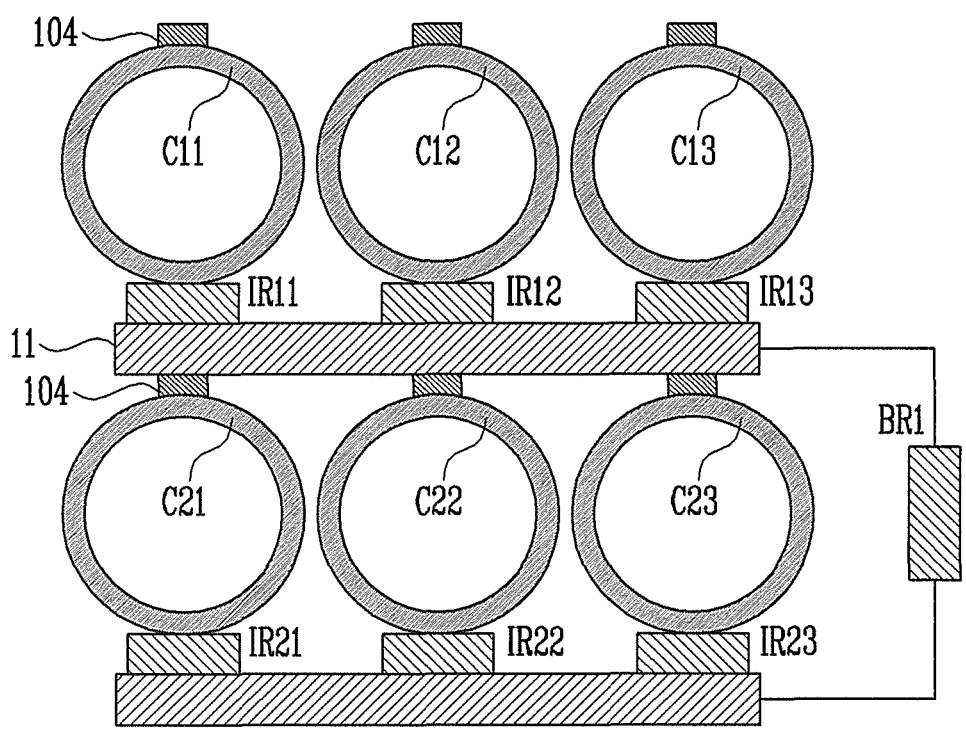

Fuel cell stacks according to embodiments of the present invention having series-parallel mixed connections are described with reference to FIGS. 6A, 6B, and 6C. FIGS. 6A, 6B, and 6C are schematic views showing portions of fuel cell stacks according to embodiments of the present invention in series-parallel mixed forms.

Referring to FIG. 6A, in a fuel cell stack having series-parallel mixed connections, the bypass resistors and the connective resistors described above in Embodiment 1 and Embodiment 2 are both used.

For the sake of convenience, unit cells connected in parallel (e.g., C21, C22, and C23) will be referred to as one bundle, a bypass resistor BR1 is connected in parallel to each bundle. Further, current collectors 11 are electrically coupled with each of the unit cells, and connective resistors IR11, IR12, and IR13 are interposed between two current collectors 11 of unit cells connected in series (e.g., a connective resistor IR11 is located between the current collectors 11 of unit cells C11 and C21).

According to the embodiment shown in FIG. 6A, in a manner similar to that described in Embodiment 2, when the performance of any one cell decreases, current flows through another cell or the bypass resistor BR1, and when electric short occurs, the connective resistor IR11, IR12, and IR13 for the unit cell of which the output rapidly increases is disconnected, such that a problem, such as damage, can be reduced.

According to another embodiment shown in FIG. 6B, the current collector 11 and the connective resistor IR1 both extend and supplement the electrical connection between unit cells connected in parallel. In the embodiment shown in FIG. 6C, only the current collector 11 extends and supplements electric connection between the unit cells connected in parallel.

In the embodiments shown in FIGS. 6A, 6B, and 6C, which are described above, the entire fuel cell stack is protected from being decreased in performance and damaged by the operation of the bypass resistors and the connective resistors, even if the performance of any one of the unit cells decreases or electric short occurs in any one of the unit cells.

According to embodiments of the present invention, it is possible to prevent or mitigate damage to the fuel cell stack and performance from considerably decreasing, even if the performance of a unit cell decreases (e.g., resistance of a unit cell abnormally increases) or electric short occurs in the fuel cell stack with a plurality of unit cells connected in series, in parallel, or in a series-parallel mixed type.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell stack comprising:
   a first bundle of unit cells electrically connected to one another in parallel;
   a current collector electrically connected to at least one unit cell of the unit cells of the first bundle; and
   a connective resistor connected in series with the at least one unit cell, the connective resistor being configured to disconnect the at least one of the unit cell when an abnormal current flows through the connective resistor to cause resistive heating and melting of the connective resistor.

2. The fuel cell stack of claim 1, further comprising a first bypass resistor electrically connected to the first bundle of unit cells in parallel.

3. The fuel cell stack of claim 2, wherein a resistance of the bypass resistor is greater than a resistance of an ohmic polarization portion of each unit cell of the first bundle of unit cells.

4. The fuel cell stack of claim 2, wherein a resistance of the bypass resistor is less than three times the sum of a resistance of an ohmic polarization portion of each unit cell of the first bundle of unit cells and a resistance of the current collector.

5. The fuel cell stack of claim 2, wherein the bypass resistor has a resistance greater than a resistance of the current collector.

6. The fuel cell stack of claim 1, further comprising a second bundle of unit cells electrically connected to one another in parallel, the second bundle of unit cells being electrically connected to the first bundle of unit cells in series.

7. The fuel cell stack of claim 6, further comprising a first bypass resistor coupled to the first bundle of unit cells in parallel.

8. The fuel cell stack of claim 1, wherein the connective resistor comprises a plurality of connective resistors, each of the connective resistors being electrically connected to a corresponding unit cell of the first bundle of unit cells.

9. The fuel cell stack of claim 8, wherein the current collector comprises a plurality of current collectors, each of the current collectors being electrically connected to the corresponding unit cell.

10. The fuel cell stack of claim 1, wherein the connective resistor has a melting point lower than a melting point of the current collector.

11. The fuel cell stack of claim 1, wherein the connective resistor has a resistance greater than a resistance of the current collector.

12. The fuel cell stack of claim 11, wherein the connective resistor is longer than the current collector in a current flow direction.

13. The fuel cell stack of claim 11, wherein the connective resistor has a cross-sectional area smaller than a cross sectional area of the current collector perpendicular to a current flow direction.

14. The fuel cell stack of claim 1, wherein the connective resistor and the current collector are composed of the same material.

15. The fuel cell stack of claim 1, wherein the connective resistors comprise a metal selected from the group consisting of Au, Ag, Pt, Ni, Cu, Fe, Cr, Mn, Ti, and combinations thereof.

16. The fuel cell stack of claim 1, wherein each of the unit cells comprises a first electrode having a first polarity and a second electrode having a second polarity different from the first polarity, wherein the first electrode is electrically connected to the current collector and the second electrode is electrically connected to the connective resistor.

* * * * *